Patented Oct. 25, 1932

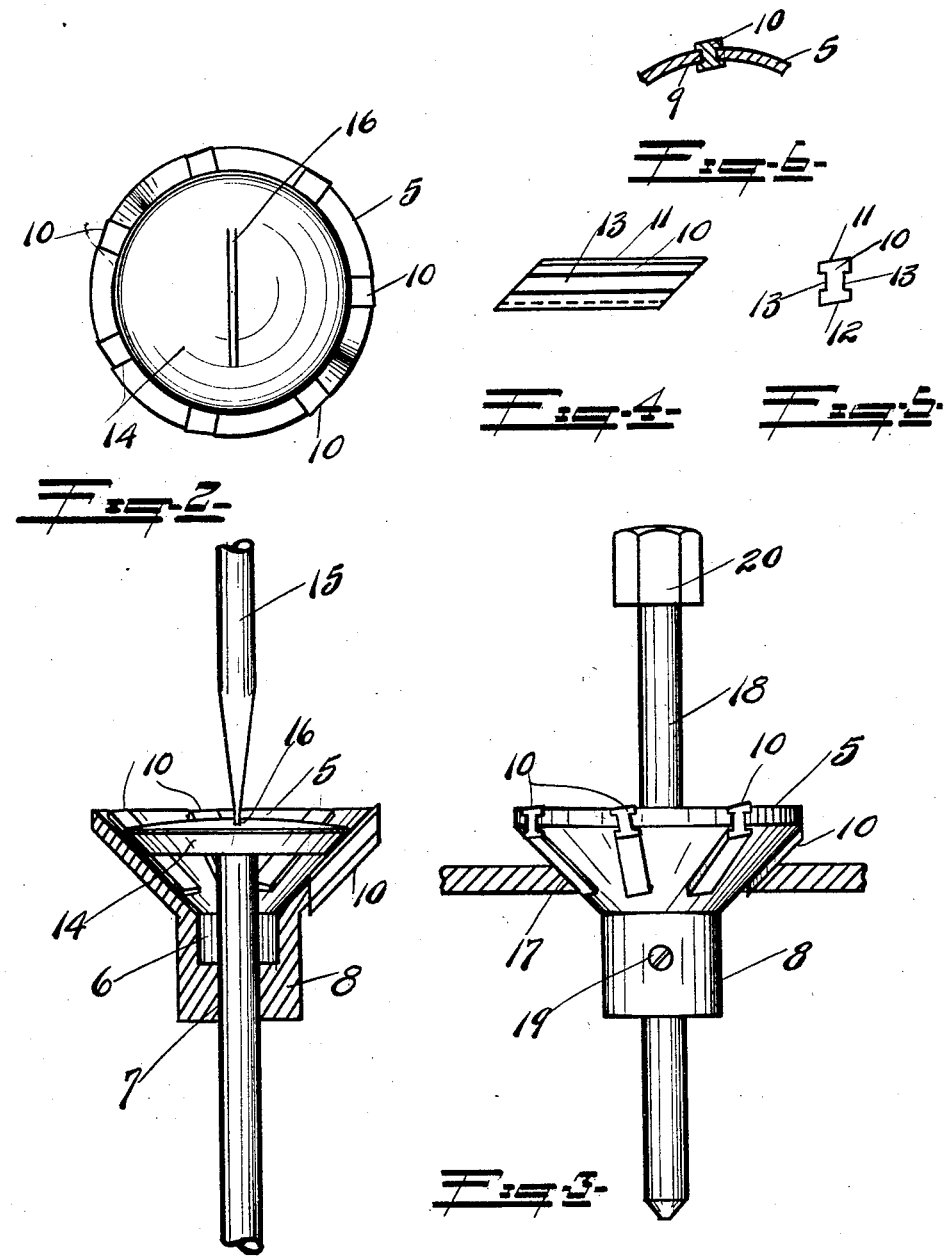

1,884,460

UNITED STATES PATENT OFFICE

JOSEPH H. WILLIAMS, OF SAGINAW, MICHIGAN

FACING TOOL

Application filed April 19, 1929. Serial No. 356,380.

My invention relates to a tool for facing valves and valve seats and particularly to a tool having inner and outer cutting faces adapted to reface worn or imperfect valves and valve seats.

The prime object of the invention is to design a tool having a plurality of double faced cutter teeth, so mounted and constructed that the tool can be used for refacing valves as well as for facing valve seats.

Another object is to provide a simple and efficient tool, which automatically adjusts itself to the valve seat being faced.

A further object is to provide a tool of substantial and durable construction, which can be readily and efficiently used by mechanics or unskilled workmen, and in which the cutters are easily removable or interchangeable for repair or renewal.

With the above and other objects in view, the present invention consists in the combination and arrangement of parts, hereinafter more fully described, illustrated in the accompanying drawing, and particularly pointed out in the appended claim, it being understood that changes may be made in the form, size, proportion, and minor details of construction, without departing from the spirit or sacrificing any of the advantages of the invention.

In the drawing.

Fig. 1 is a sectional side view of my improved facing tool showing a valve in position for refacing.

Fig. 2 is a top plan view thereof.

Fig. 3 is a side view showing the tool used for refacing a valve seat.

Fig. 4 is an edge view of one of the cutter members.

Fig. 5 is an end view thereof.

Fig. 6 is a fragmentary sectional plan view of the cutter head.

Referring now particularly to the drawing, the numeral 5 indicates a cutter head, conical in shape and formed at its apex with an enlarged cylindrical chamber 6, opening into a centrally disposed passage 7 formed in the hub 8. Spaced apart elongated slots 9 are provided in the cutter head as shown, and are adapted to accommodate the cutter blades 10 which are mounted therein, said cutter blades being formed as clearly shown in Figs. 4 and 5 of the drawing, the inner and outer faces 11 and 12 respectively being beveled as shown, and grooves 13 are provided in the side walls, so that the blades will removably fit the slots in the head, the ends of the cutters being angled, so that the ends will be flush with the wall of the cutter head, and it will therefor be obvious that these blades can be formed from a long solid bar, said bar being first grooved, and then cut to suitable lengths, thereby making a very simple and economical manner of forming the cutter blades.

The cutter blades and head are of course of a predetermined thickness, so that when the blades are in assembled position, the inner and outer face of said blades project beyond the wall of the head, the grooves being cut so that the inner and outer faces are angled, and a sharp cutting edge is provided, the angle of the inner face being the same as the angle of the outer face.

In Fig. 1 of the drawing, I have shown the tool as used for facing a valve 14, in this operation, the tool is held stationary, and a suitable instrument, such as a screw driver 15 or the like, engages the slot 16, so that the valve can be oscillated or rotated and the valve is properly faced. When using the tool for facing a valve seat 17, a pin 18 is provided and is inserted in the head as shown, a set screw 19 being threaded in the hub 8 for securing the tool to the pin, one end of said pin being formed with a head 20, which is adapted to be engaged by a suitable instrument to facilitate the oscillation of the tool.

From the foregoing description, it will be obvious that I have provided a very simple and economical tool in which the cutter blades can be readily removed or replaced for repair or renewal, and which is adapted for facing valve seats as well as the valves.

What I claim is:—

A cutter blade for a valve facing tool, comprising a rhomboid shaped bar having parallel grooves on two opposing side walls to cooperate with the facing tool, so that when the bar is placed in position in the tool, the acute angled edges present cutting edges to the work.

In testimony whereof I hereunto affix my signature.

JOSEPH H. WILLIAMS.